(12) United States Patent
Gashgaee

(10) Patent No.: US 6,832,626 B2
(45) Date of Patent: Dec. 21, 2004

(54) MODULAR TWO WAY CHECK VALVE CONSTRUCTION

(75) Inventor: Iraj Gashgaee, Waltham, MA (US)

(73) Assignee: Mykrolis Corporation, Billerica, MA (US)

(*) Notice: Subject to any disclaimer, the term of this patent is extended or adjusted under 35 U.S.C. 154(b) by 0 days.

(21) Appl. No.: 10/343,987

(22) PCT Filed: Aug. 28, 2001

(86) PCT No.: PCT/US01/26719
§ 371 (c)(1),
(2), (4) Date: Feb. 5, 2003

(87) PCT Pub. No.: WO02/18822
PCT Pub. Date: Mar. 7, 2002

(65) Prior Publication Data
US 2003/0205276 A1 Nov. 6, 2003

Related U.S. Application Data

(60) Provisional application No. 60/229,213, filed on Aug. 31, 2000.

(51) Int. Cl.$^7$ .......................... F16K 11/10; F16K 15/02
(52) U.S. Cl. ................ 137/512; 137/512.3; 137/614.2; 251/333
(58) Field of Search .............................. 137/512, 512.3, 137/565.15, 613, 614.2, 543.19; 251/333

(56) References Cited

U.S. PATENT DOCUMENTS

| | | | | |
|---|---|---|---|---|
| 852,334 A | * | 4/1907 | Lewis | ......................... 137/455 |
| 1,889,122 A | * | 11/1932 | Hewitt | ..................... 137/512.3 |
| 2,444,182 A | | 6/1948 | Calvin | |
| 2,684,080 A | | 7/1954 | Crowell | |
| 4,111,228 A | | 9/1978 | Simionescu | |
| 4,142,675 A | * | 3/1979 | Maltby | ......................... 236/86 |
| 4,373,550 A | * | 2/1983 | Yelich | ................... 137/516.29 |
| 4,432,386 A | * | 2/1984 | Pacht | .......................... 137/327 |
| 4,848,729 A | * | 7/1989 | Danzy | ........................ 251/332 |
| 4,930,686 A | * | 6/1990 | Ellison | ........................ 222/394 |
| 5,297,576 A | | 3/1994 | Weinheimer | |

FOREIGN PATENT DOCUMENTS

| | | |
|---|---|---|
| FR | 2528936 | 12/1983 |
| JP | 57167572 | 10/1982 |
| WO | WO 02/18822 | 3/2002 |

* cited by examiner

*Primary Examiner*—Ramesh Krishnamurthy
(74) *Attorney, Agent, or Firm*—Paul J. Cook; Timothy J. King; Mykrolis Corporation

(57) ABSTRACT

A check valve construction is provided which includes a housing having a first flow path and a second flow path. Liquid flow is controlled within the first and second flow path by movable plungers (22, 24) having a sealing surface and a plurality of prongs that control the length of movement of the plunger within the housing. One of the plungers permits liquid flow while the other of the plungers prevents liquid flow in response to pressure change within the flow paths.

8 Claims, 5 Drawing Sheets

MODULAR TWO WAY CHECK VALVE CONSTRUCTION

This application is derived from PCT/US01/26719, Aug. 28, 2001 which claims the benefit of provisional appln. No. 60/229,213 filed Aug. 31, 2000.

BACKGROUND OF THE INVENTION

1. Field of the Invention

This invention relates to a modular two-way check valve construction for delivering precise volumes of a liquid repeatedly. More particularly, this invention relates to a check valve construction which changes direction of fluid flow automatically.

2. Description of Prior Art

A variety of industries require the delivery of precise volumes of a liquid to an area of use. For example, precise volumes of a photoresist composition are delivered to a silicon wafer substrate in order to form a photoresist layer of uniform thickness onto the wafer. The requirement for precise volume delivery must be effected by an apparatus which is capable of delivering the same volumes of samples repeatedly over long periods.

A wide variety of apparatus utilizing a pump and a check valve arrangement presently are available for delivering liquids. The check valve is intersposed between a reservoir for the liquid and the point of use of the liquid and functions to control liquid flow from the reservoir in response to pressure on the liquid provided by a pump. Typically, a three way valve is utilized which is operated by a motor that responds to a signal from an electrical controller. The use of this arrangement is undesirable since the three way valve has a tendency to seize, and the arrangement requires a belt transmission and a motor which are expensive and are subject to breakdown.

Accordingly, it would be desirable to provide a two-way check valve apparatus capable of delivering precise volumes of liquid repeatedly. In addition, it would be desirable to provide such a check valve apparatus which is capable of changing fluid direction automatically while delivering precise volumes of liquid over extended time periods without the need for an auxiliary motor controlling the check valve apparatus.

SUMMARY OF THE INVENTION

The present invention provides a check valve construction which utilizes either two free floating plungers, each positioned within a separate liquid flow path or one free floating plunger and a spring loaded plunger, each positioned within a separate liquid flow path. A free floating plunger is positioned with a liquid flow path between a liquid reservoir and a pump. A second free floating plunger or spring loaded plunger is positioned within a liquid flow path between the pump and a point of use of the liquid. The free floating plunger and the spring loaded plunger function to permit liquid flow or to prevent liquid flow in response to a pressure generated by the pump. The free floating plunging and spring loader plunger are sized so that they do not restrict liquid flow when open. The check valve of the invention eliminates the need for a motor and accompanying motor support means for operating the check valve.

BRIEF DESCRIPTION OF THE DRAWINGS

FIG. 2b is a front view of the free floating plunger of FIG. 2a.

FIG. 3b is a front view of the spring loaded plunger of FIG. 3a.

DESCRIPTION OF SPECIFIC EMBODIMENTS

The check valve construction of this invention includes at least one free floating plunger having a sealing surface and at least two prongs, preferably three or four prongs which are positioned on a surface opposite the sealing surface. The sealing surface can be a flat surface or can include a raised lip extending around the circumference of the sealing surface. The raised lip, when utilized, functions as the sealing surface. The prongs provide a means for stabilizing the position of the plunger within a liquid flow path so that it is oriented to alternately permit or prevent liquid flow within the liquid flow path.

The prongs cooperate with a seat within the flow path which, together with the seat for the sealing surface defines the permitted length of travel of the plunger within the liquid flow path. A free floating plunger is positioned within the liquid flow path between a liquid reservoir and a pump.

A free floating plunger described above or a spring loaded plunger is positioned within a liquid flow path between the pump and a point of use of the liquid. The spring loaded plunger has a sealing surface which can be flat or can have a raised lip about the circumference of the sealing surface. At least two prongs, preferably three or four prongs, are secured on a surface opposite the sealing surface. The prongs are in contact with a spring which permits the spring loaded plunger to open or close a liquid flow path in response to pressure exerted by the pump. The prongs orient the spring loaded plunger so that it can effect its function of opening or closing the liquid flow path within which it is positioned.

The free floating plunger is utilized within the liquid flow path between the liquid reservoir and the pump. It is preferred to utilize the spring loaded plunger within the liquid flow path between the pump and the point of use of the liquid.

Figure 1:
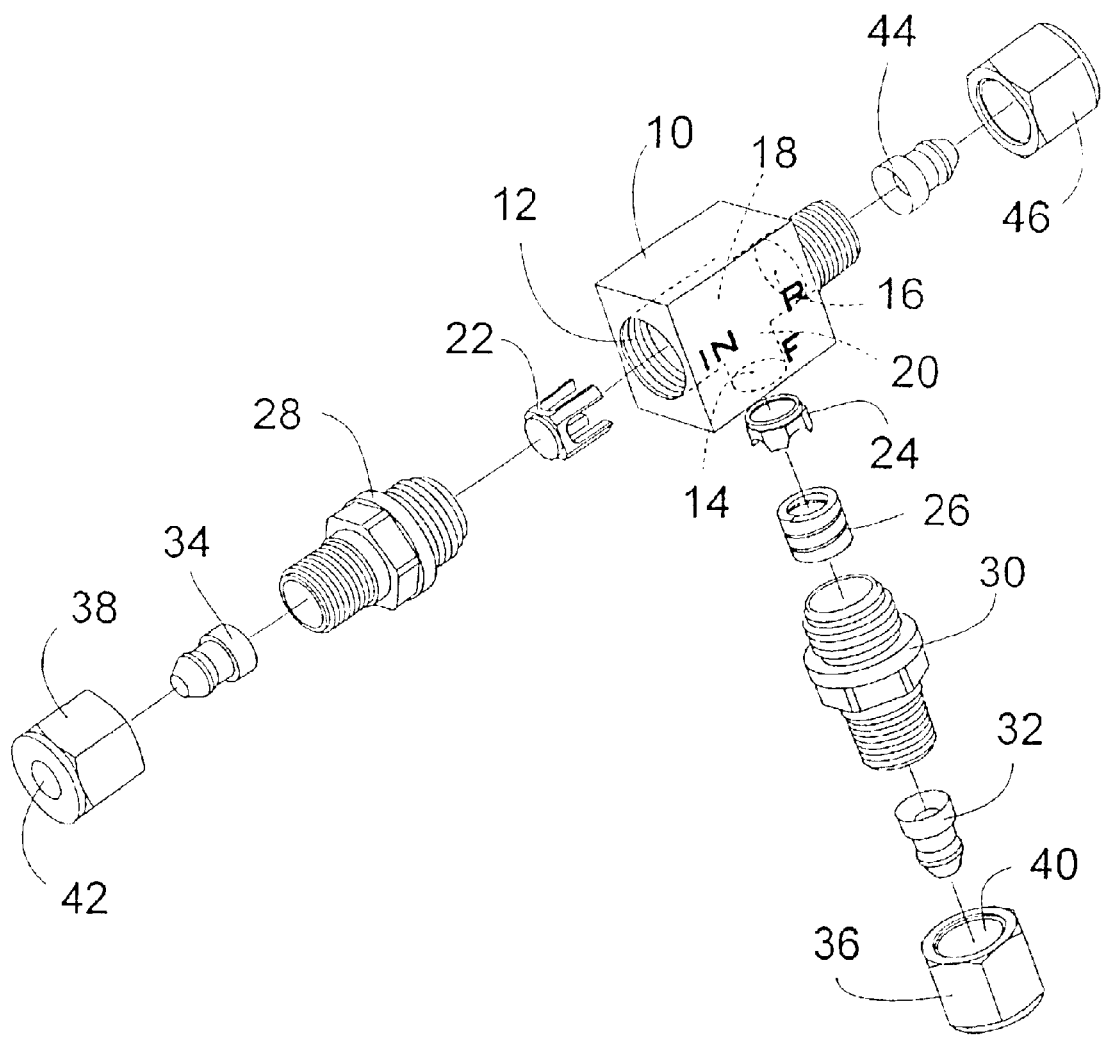
FIG. 1 is an exploded view of one embodiment of the check valve construction of this invention.

Referring to FIG. 1, the check valve construction of this invention includes a housing 10 having an opening 12, an opening 14 and an opening 16 to form liquid flow paths 18 and 20. The free floating plunger 22 is sized to fit into opening 12. The spring-loaded plunger 24 is sized to fit into opening 14. Spring loaded plunger 24 contacts spring 26. Free floating plunger 22 fits within fitting 28 so that the plunger 22 is free to move within fitting 28 and housing 10. Connectors 32 and 34 fit into fittings 30 and 28 respectively and are secured by nuts 36 and 38. Nuts 36 and 38 include openings 40 and 42 into which tubes can be inserted to be positioned on pillar connectors 32 and 34. Connector 34 is in fluid communication with a liquid reservoir (not shown). Connector 32 is in fluid communication with a point of use for the liquid (not shown). Connector 44 is secured into opening 16 by nut 46 and is in fluid communication with a pump (not shown).

Figure 2A:
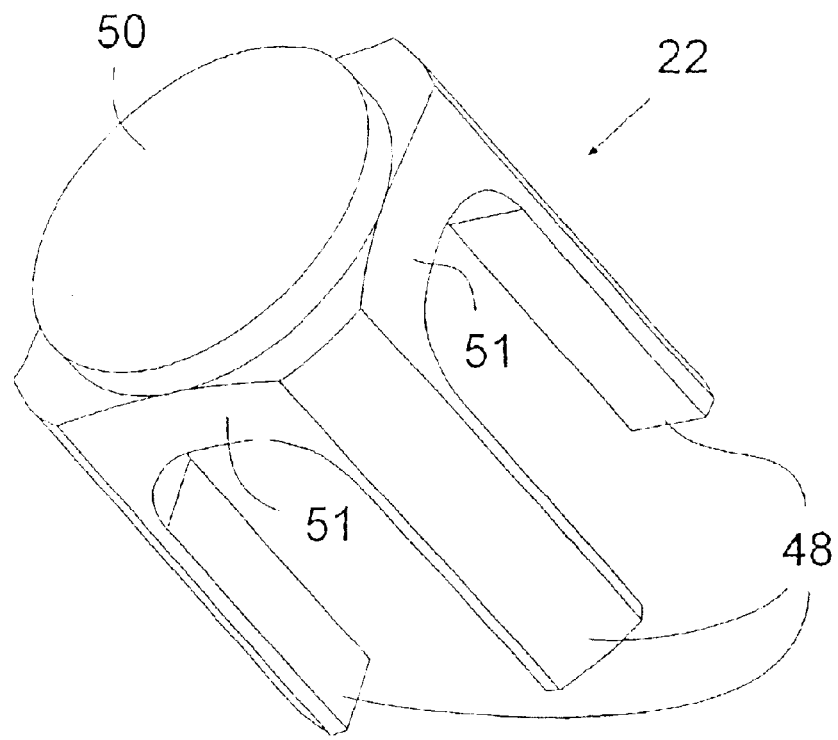
FIG. 2a is an isometric view of the free floating plunger utilized in the check valve construction of this invention.
Figure 2B:
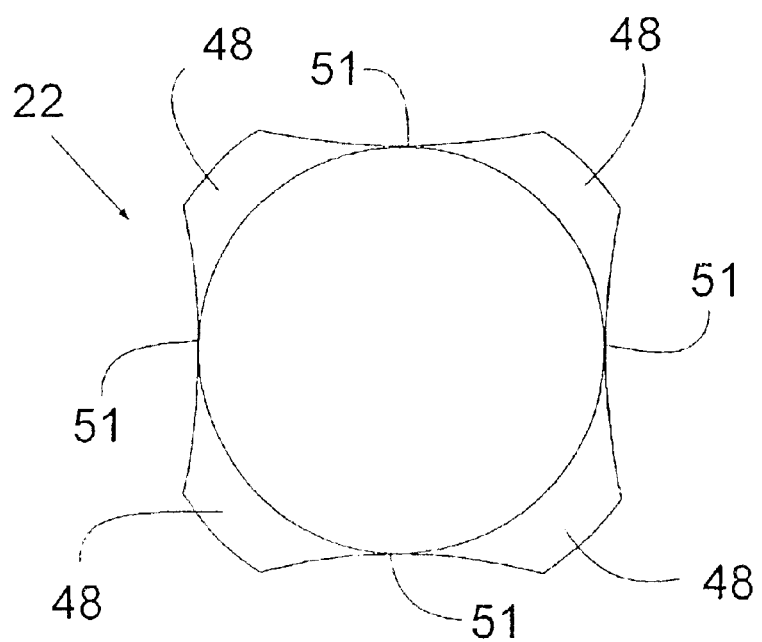

Referring to FIGS. 2a and 2b, the free floating plunger 22 includes a flat sealing surface 50 which seats on a seating surface within connector 28 to prevent liquid flow to the connector 10. Plunger 22 includes legs 48 which position plunger 22 within connector 10. The prongs 48 typically have a length between about 0.425 inch and about 0.435 inch. The plunger 22 includes concave surfaces 51 which form spaces which permit liquid to bypass plunger 22. The total cross-sectional area of the space between the concave surfaces 51 and the inner surface of connector 28 or connector 10 equals or exceeds the cross sectional area of the liquid flow path in connector 28 and of the liquid flow path in connector 10. As shown in FIGS. 2a and 2b, four concave surfaces are utilized. It is to be understood that at least two concave surfaces, preferably three or four concave surfaces can be utilized. Thus, the plunger 22 does not restrict liquid flow within the liquid flow path it is located. When a vacuum is drawn by a pump (not shown) in fluid communication with opening 16, plunger 22 is moved toward connector 10 through opening 12 thereby to permit liquid flow from connector 28 to connector 10. At the same time, spring 26 expands to position the plunger 24 into the connector 10 thereby to prevent liquid flow to connector 30. When the pump (not shown) increases pressure, the direction of movement of the plunger 22 is reversed so that it effects sealing of liquid within connector 28 and to compress spring 26 thereby to permit flow within the flow path containing the plunger 24 to direct liquid past plunger 24 to the point of use of the liquid.

Figure 3A:
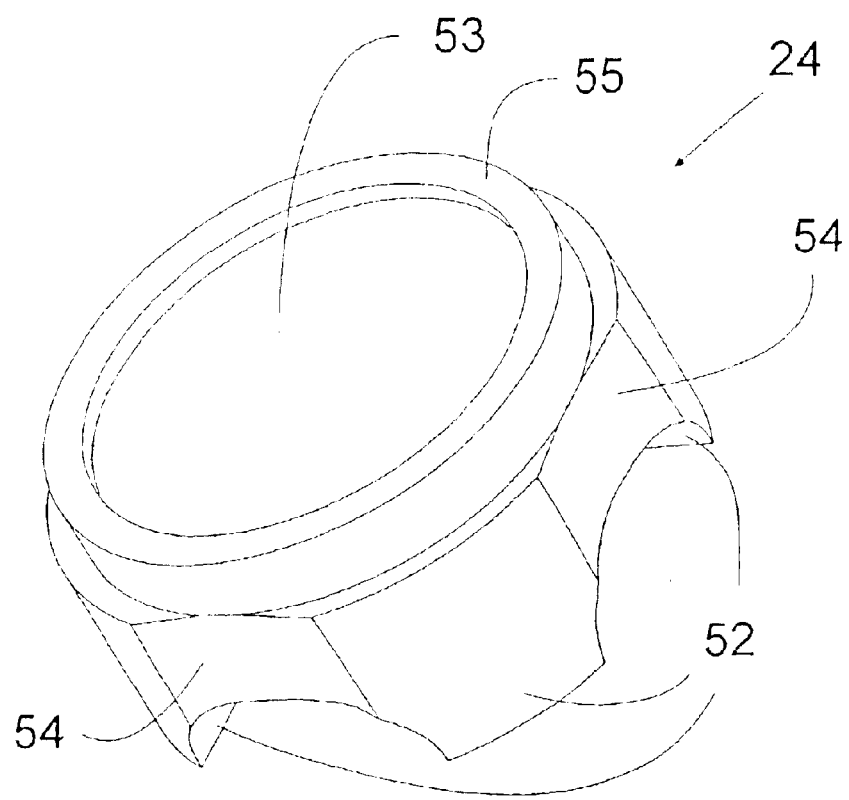
FIG. 3a is an isometric view of the spring loaded plunger utilized in the check valve construction of this invention.
Figure 3B:
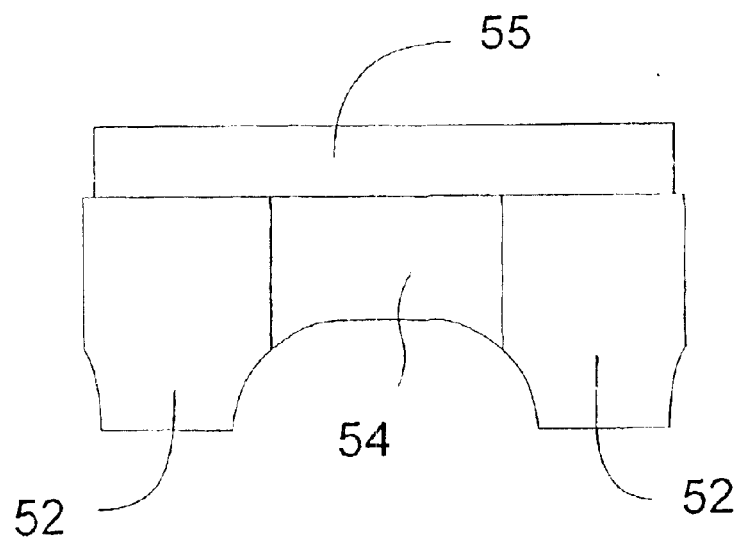

As shown in FIGS. 3a and 3b, the spring loaded plunger 24 includes a sealing surface comprising a flat surface 53 which supports a raised lip 55 which extends about the periphery of surface 53. The spring loaded plunger 24 also includes prongs 52 and concave surfaces 54. The prongs 52 are attached to a surface opposite the flat surface 53. The prongs 52 typically have a length between about 0.0085 inch and about 0.095 inch. The total space defined by the concave surfaces 54 and the inner surface of connector 30 or connector 10 have a total cross sectional area liquid equal to or greater than the smallest cross sectional area in connectors 10 or 30, connector 32 and nut 40. As shown in FIGS. 3a and 3b, four concave surfaces are utilized. It is to be understood that at least two concave surfaces, preferably three or four concave surfaces can be utilized. It is also to be understood that the sealing surface 50 of plunger 22 also can include a lip about its periphery to form a seal as described with reference to FIGS. 3a and 3b. It is also to be understood that surface 53 can be free of lip 55 so that surface 53 can function as the sealing surface as described with reference to surface 50 or FIGS. 2a and 2b.

Figure 4:
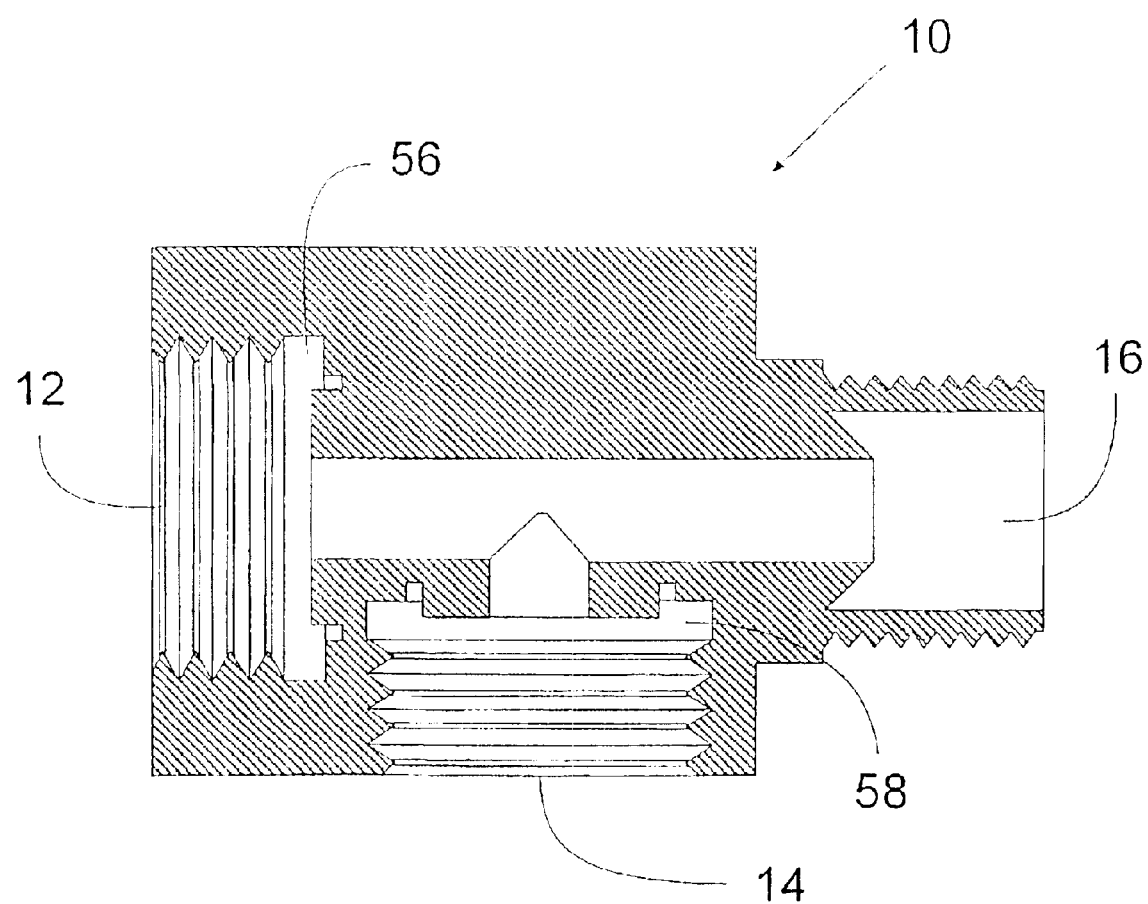
FIG. 4 is a cross-sectional view of a plunger housing utilized in the check valve construction of this invention.

Referring to FIG. 4, the seat 56 comprises the surface which cooperates with plunger legs 48 to stop movement of plunger 22. The seat 58 cooperates with sealing surface 53 of plunger 22 to effect sealing within opening 14.

Figure 5:
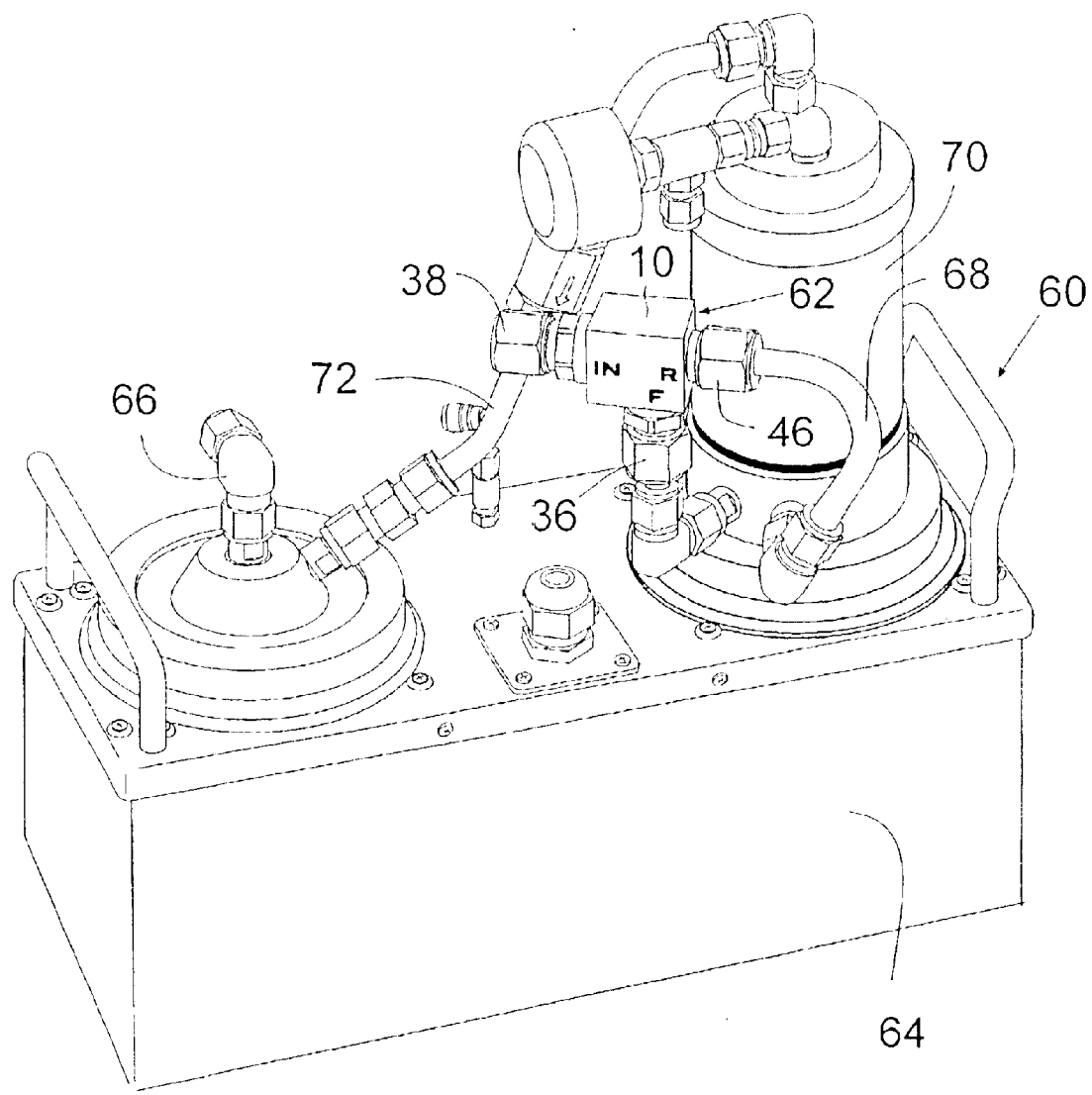
FIG. 5 is an isometric view of a liquid delivery apparatus utilizing the check valve construction of this invention.

Referring to FIG. 5, a dispensing assembly 60 is shown which utilizes the check valve construction 62 of this invention is shown. The assembly 60 includes a pump (not shown) positioned within housing 64. The nut 46 connects to a conduit 66 connected to a point of use for the liquid (not shown) through conduit 68, reservoir 70 and conduit 72. Nut 38 is connected liquid reservoir (not shown).

What is claimed is:

1. A dispensing assembly which comprises:
a first housing including a first liquid flow path through said first housing between a first opening and a second opening and a second liquid flow path between a third opening of said first housing and said first liquid flow path,
a first free floating movable plunger positioned within said first liquid flow path between said first housing and a first connector,
said first free floating movable plunger having a first sealing surface, at least two first prongs attached to a surface opposite said first sealing surface and a plurality of first concave surfaces interposed between said at least two first prongs, said at least two first prongs and said plurality of first concave surfaces having a common top surface,
a second movable spring loaded plunger positioned within said second liquid flow path,
said second movable spring loaded plunger having a second sealing surface, at least two second prongs attached to a surface opposite said second sealing surface and a plurality of second concave surfaces interposed between said at least two second prongs, said at least two second prongs and said plurality of second concave surfaces having a common top surface,
said first liquid flow path and said second liquid flow path in fluid communication with means for changing pressure within said flow paths.

2. A dispenser assembly which comprises:
a first housing including a first liquid flow path through said first housing between a first opening and a second opening and a second liquid flow path between a third opening of said first housing and said first liquid flow path,
a first free floating movable plunger positioned within said first liquid flow path between said first housing and a first connector,
said first free floating movable plunger having a first sealing surface, at least two first prongs attached to a surface opposite said first sealing surface and a plurality of first concave surfaces interposed between said at least two first prongs, said at least two first prongs and said plurality of first concave surfaces having a common top surface,
a second movable free floating plunger positioned within said second liquid flow path,
said second movable free floating plunger having a second sealing surface, at least two second prongs attached to a surface opposite said second scaling surface and a plurality of second concave surfaces interposed between said at least two first prongs, said at least two second prongs and said plurality of second concave surfaces having a common too surface,
said first liquid flow path and said second liquid flow path in fluid communication with means for changing pressure within said flow paths.

3. The dispenser assembly of claim 1 wherein said first free floating movable plunger has four of said first concave surfaces and said second movable plunger has four of said second concave surfaces.

4. The dispenser assembly of claim 2 wherein said first free floating movable plunger has four of said first concave surfaces and said second movable plunger has four of said second concave surfaces.

5. The dispenser assembly of claim 1 wherein said first sealing surface comprises a substantially flat surface.

6. The dispenser assembly of claim 2 wherein said first sealing surface comprises a lip extending about a periphery of a substantially flat surface.

7. The dispenser assembly of claim 1 wherein said second sealing surface comprises a lip extending about a periphery of a substantially flat surface.

8. The dispenser assembly of claim 2 wherein said second sealing surface comprises a lip extending about a periphery of a substantially flat surface.

* * * * *